United States Patent [19]

Rivera et al.

[11] Patent Number: 5,895,614
[45] Date of Patent: Apr. 20, 1999

[54] METHOD OF FORMING A MICROCELLULAR FOAM PLANK

[75] Inventors: Patricia J. Rivera, Cambridge, Mass.; Lisa A. Nickerson, Lake George; Kim A. Bly, Queensbury, both of N.Y.

[73] Assignee: Tenneco Protective Packaging Inc., Glens Falls, N.Y.

[21] Appl. No.: 08/699,738

[22] Filed: Aug. 20, 1996

Related U.S. Application Data

[XX .
[60] Provisional application No. 60/002,624, Aug. 22, 1995.
[51] Int. Cl.$^6$ .............................. B29C 44/20; B29C 44/46
[52] U.S. Cl. ................................. 264/50; 264/51; 264/53
[58] Field of Search ..................... 264/51, 53, 50

[56] References Cited

U.S. PATENT DOCUMENTS

| | | |
|---|---|---|
| 3,644,230 | 2/1972 | Cronin . |
| 3,766,099 | 10/1973 | Kawai et al. . |
| 3,966,651 | 6/1976 | Kleiner et al. ........................ 521/95 |
| 4,101,467 | 7/1978 | Park et al. . |
| 4,110,269 | 8/1978 | Ehrenfreund . |
| 4,129,530 | 12/1978 | Park et al. . |
| 4,214,054 | 7/1980 | Watanabe et al. . |
| 4,217,319 | 8/1980 | Komori . |
| 4,251,584 | 2/1981 | Van Engelen et al. ................ 428/159 |
| 4,323,528 | 4/1982 | Collins . |
| 4,357,329 | 11/1982 | Heywang et al. . |
| 4,387,169 | 6/1983 | Zabrocki et al. . |
| 4,473,665 | 9/1984 | Martini-Vvedensky et al. . |
| 4,525,486 | 6/1985 | Kobayashi et al. ........................ 521/59 |
| 4,572,740 | 2/1986 | Kretzschmann et al. . |
| 4,640,933 | 2/1987 | Park . |
| 4,663,361 | 5/1987 | Park . |
| 4,694,027 | 9/1987 | Park . |
| 4,806,293 | 2/1989 | Akiyama et al. . |
| 4,931,434 | 6/1990 | Broom et al. . |
| 4,946,871 | 8/1990 | Brichta et al. . |
| 4,959,397 | 9/1990 | Brichta et al. . |
| 5,059,631 | 10/1991 | Hovis et al. . |
| 5,089,533 | 2/1992 | Park . |
| 5,098,782 | 3/1992 | Hovis et al. . |
| 5,160,674 | 11/1992 | Colton et al. ........................ 264/50 |
| 5,202,069 | 4/1993 | Pontiff . |
| 5,208,266 | 5/1993 | Yamazaki . |
| 5,225,451 | 7/1993 | Rogers et al. . |
| 5,246,976 | 9/1993 | Pontiff . |
| 5,290,822 | 3/1994 | Rogers et al. . |
| 5,340,840 | 8/1994 | Park et al. . |
| 5,348,458 | 9/1994 | Pontiff . |
| 5,348,984 | 9/1994 | Lee . |
| 5,366,675 | 11/1994 | Needham . |
| 5,399,592 | 3/1995 | Park . |
| 5,405,883 | 4/1995 | Park . |
| 5,411,684 | 5/1995 | Tusim et al. . |
| 5,428,093 | 6/1995 | Lee . |

*Primary Examiner*—Allan R. Kuhns
*Attorney, Agent, or Firm*—Arnold White & Durkee

[57] ABSTRACT

Blended non-crosslinked polyolefin compositions, which is processable into a foamed product having a fine-celled structure, including a polyolefin, optionally a copolymer of an olefin and a different ethylenic monomer, and effective amount of a fatty acid compound permeability control agent, and an effective amount of a nucleating agent. A process of preparing fine-celled foam products from the blended composition, and the final fine-celled foam products.

22 Claims, No Drawings

METHOD OF FORMING A MICROCELLULAR FOAM PLANK

This application claims the benefits of U.S. Provisional Application 60/002,624 filed Aug. 22, 1995.

BACKGROUND OF THE INVENTION

1. Field of the Invention

The invention relates to non-crosslinked low or high density polyolefin foam having a fine-celled closed structure and a process of preparing the low or high density polyolefin foam.

2. Background Art

Non-crosslinked foams in the prior art made with the herein described extrusion accumulator process typically had cells within the 20 to 30 cells per inch range. Attempts to make the non-crosslinked thick cross-sectional foams with a higher cell count resulted in non-flat/wavy foam, voids, ripples, or the like.

BROAD DESCRIPTION OF THE INVENTION

The main objectives of the invention is to cure the problems of the above stated prior art and to provide a non-crosslinked foam product, which offers the properties of a crosslinked foam product, but with a finer cell count typically greater than 50 cells per inch and a soft, non-abrasive feel while providing capability to be recycled, which is extrinsic to a crosslinked foam product. Other objectives and advantages of the invention are set out herein or are obvious herefrom to one skilled in the art.

The objectives and advantages of the invention are achieved by the compositions, foams and processes of the invention.

The invention involves a blended non-crosslinked polyolefin composition which is processable into a foamed product, preferably foamed plank, comprising a polyolefin, optionally a copolymer of an olefin and a different ethylenic monomer, an effective amount of a fatty acid compound permeability agent, and an effective amount of a nucleating agent. The non-crosslinked foamed product of the invention offers the properties of a crosslinked foam product and has a finer cell count typically greater than 50 cells per inch and a soft, nonabrasive feel. The non-crosslinked foamed product has the capability of being recycled, which is extrinsic to a crosslinked foamed product. To improve the softness of the foam product, the optional copolymer is a copolymer of an olefin and an ester monomer. To improve the strength and/or stiffness of the foam product, an ionomer resin can be included in the blend. Isobutane blowing agent is also usually present in an amount of from 5 to 30 parts, best from 10 to 20 parts, per 100 parts of the polymer blend composition during the operation/process of preparing the foam.

Preferably the polyolefin is polyethylene. Preferably the copolymer is ethylene vinyl acetate copolymer or ethylene methyl acrylate copolymer. Preferably the fatty acid compound stability agent is glycerol monostearate. Preferably the nucleating agent is (a) crystalline silica, or (b) sodium bicarbonate-citric acid, or (c) talc.

In the most preferred blended polymer composition the polyolefin is low density polyethylene, the copolymer is ethylene methyl acrylate copolymer, the fatty acid compound permeability control agent is glycerol monostearate and the nucleating agent is crystalline silica.

The invention also involves a process for preparing an expanded non-crosslinked low or high density polyolefin foam, which offers crosslinked foam product, with a finer cell count typically greater than 50 cells per inch and a soft, non-abrasive feel while also providing capability to be recycled, whereas crosslinked foam does not. The process includes forming a mixture of a polyolefin, optionally a copolymer of an olefin and a different ethylenic monomer, an effective amount of a fatty acid compound permeability agent, an effective amount of a nucleating agent and an effective amount of isobutane blowing agent, dissolved in the polyolefin and copolymer, under pressure. The mixture has a temperature at which the viscosity of the mixture is sufficient to retain the blowing agent when the mixture is allowed to expand. The mixture is extruded into a holding zone maintained at a temperature and pressure which does not allow the resulting mixture to foam. The extrusion is done without an extrusion die. The holding zone has an outlet die defining an orifice opening into a zone of lower pressure at which the mixture foams. An openable gate closes the die orifice and periodically the gate is opened and substantially concurrently therewith mechanical pressure is applied by a movable ram of the mixture to eject the mixture from the holding zone through the die orifice into the zone of lower pressure, at a rate greater than that at which substantial foaming in the die orifice occurs and less than that at which substantial irregularities in cross-sectional area or shape occurs. The ejected mixture is permitted to expand unrestrained in at least one dimension to produce an elongated cellular body.

In the invention process, using the accumulator process described in U.S. Pat. No. 4,323,528, flat fine-celled closed plank structures can be produced.

The invention further involves an expanded non-crosslinked low or high density polyolefin foam having a fine-celled closed structure, which is prepared by the invention process.

The invention foam is a plank foam with dimensions of typically 108 inches by 24 inches by 2 inches (or 3 inches). The invention foam will replace bun stock crosslinked foam. Manufacturers of such crosslinked foam include Sentinel, Voltek, and Monarch Rubber Company. The invention foam is a fine-cell (microcellular), soft material. The invention foam is preferably made with low density polyethylene, ethylene vinyl acetate or ethylene methyl acrylate, isobutane blowing agent, a fatty acid (glycerol monostearate) to prevent collapse of the foam, and a nucleating agent, for example, crystalline silica or sodium bicarbonate-citric acid or talc. The invention non-crosslinked foam compares favorably to many of the physical characteristics of a crosslinked foam. However, unlike crosslinked foam, the invention foam is recyclable.

DETAILED DESCRIPTION OF THE INVENTION

The invention involves non-crosslinked polyolefin foam which offers the properties of a crosslinked product with fine-celled (microcellular) structure with cell counts typically greater than 50 cells per inch and a soft, non-abrasive feel while also providing capability to be recycled (whereas crosslinked foam does not).

The foamed product is prepared from a blend of a polyolefin and a copolymer of an olefin and a different (nonionic) ethylenic monomer. Preferably the polyolefin is a low density ethylene homopolymer. Preferably the copolymer is an ethylene vinyl acetate copolymer or an ethylene methyl acrylate copolymer. The copolymers are usually soft or have low stiffness.

Examples of the thermoplastic polyolefins are polyethylenes and polypropylenes. The polyethylenes can be HDPE, MDPE, LDPE and LLDPE.

Examples of the ethylene copolymers are ethylene vinyl acetate copolymers, ethylene-1-butene copolymers, ethylene methyl acrylate copolymers, ethylene-acrylic acid copolymers, and the like.

The amount of the polyolefin in the polymer blend typically is 5 to 95 percent, preferably about 85 percent based on the total weight of the polymer blend composition (excluding the blowing agent).

The amount of the copolymer of an olefin and a different ethylenic monomer in the polymer blend typically is 5 to 25 percent, preferably about 12 percent, based on the total weight of the polymer blend composition (excluding the blowing agent). In the copolymer, the different ethylenic monomer is preferably used in the amount of about 5 to 20 percent, based on the total weight of the copolymer.

To improve softness, copolymers containing esters, such as, ethylene methyl acrylate (EMA) or ethylene vinyl acetate (EVA), can be added to the mixture with a total ester monomer content of the final product (or the polymer blended composition, excluding the blowing agent) in the range of up to 20 percent, preferably about 2.4 percent, to allow best control of the process.

The melt indices for some of the preferred components of the invention blends are:

| Material | Melt Index (gms/10 min.) |
| --- | --- |
| EMA | 2.0 |
| EVA (UE 630) | 1.8 |
| PE | 1.8–2.2 |

A fatty acid compound permeability control agent is added to the polymer blend composition to enhance dimensional stability in the foam product. Preferred fatty acid permeability control agents include amides and esters of $C_{12-24}$ fatty acids. Such permeability control agents are taught in U.S. Pat. Nos. 3,644,230 and 4,214,054, which are incorporated herein by reference. Preferred individual permeability control agents include steryl stearamide, glycerol monostearate, glycerol monobehenate, and sorbitol monostearate. The most preferred permeability control agent is glycerol monostearate. Typically, such fatty acid compound permeability control agents are employed in an amount ranging from about 0.1 to about 5 parts per hundred parts of the polymer blend composition (excluding the blowing agent), or preferably about 1.5 weight percent based on the polymer blend composition (excluding the blowing agent) to prevent foam collapse.

The fatty acid compound permeability control agents include partial esters of long chain fatty acids with polyols, fatty acid amides, complete esters of fatty acids, etc. Some further examples thereof are glycerol distearate, glyceryl monobenzoate and sorbitan monooleate.

The nucleating agent is used to regulate cell size within the foam. The nucleating agent preferably is (a) crystalline silica, or (b) sodium bicarbonate citric acid, or (c) talc. The most preferred nucleating agent is crystalline silica and is typically used in amounts of 10 to 25 percent by weight, most preferably about 13 to 17 weight percent, based upon the weight of the total composition (excluding the blowing agent). The preferred sodium bicarbonate-citric acid nucleating agents are commercially available under the trademark HYDROCEROL. The preferred sodium bicarbonate-citric acid is Hydrocerol CF-70 or Hydrocerol CF-40 (a particulate/powder of, respectively, a 70 or 40 percent concentration of sodium bicarbonate and citric acid in a wax and polyethylene base in pellet form). The nucleating agent is typically used in amounts of from 0.1 to 5 percent by weight, preferably 0.2 to 2 percent by weight, most preferably about 0.5 weight percent, based upon the weight of the total composition (excluding the blowing agent).

In U.S. Pat. No. 4,572,740 (column 3, line 18), it is disclosed that "hydrocerol" nucleating agent is also a blowing agent. The melt temperature (i.e., approximately, 220° F.) of the invention is well below the temperature in U.S. Pat. No. 4,572,740. Therefore, the "hydrocerol" nucleating agent is purely a nucleating agent in the invention process.

Other nucleating agents, such as, clay, mica, titanium oxide, zinc oxide, calcium silicate, and metallic salts of fatty acids such as barium stearate, zinc stearate and aluminum stearate, can be used. Nucleating agents are usually finely divided and may be pelletized, encapsulated, and the like.

The polymer blend composition can also contain up to 10 percent, preferably about 3 percent, based upon the total weight of the polymer blend composition (excluding the blowing agent), of an ionomeric resin. The ionomeric resin is a cation initiated crosslinked polymer of ethylene and a vinyl acid, preferably a zinc or sodium ion initiated crosslinked polymer of ethylene and methacrylic acid. An ionomer is a thermoplastic polymer that is ionically crosslinked to form bonds between the acid groups within a chain and neighboring chains. The ionomers improve the strength and/or the stiffness of the microcellular foam planks. In general, ionomers are transparent, resistant to abrasion and solvents, have excellent electrical properties, and have outstanding puncture and low temperature impact resistance. Ionomeric resins are recyclable. (Note that the ionomeric resin is not a crosslinking agent regarding the foam of the invention.)

The preferred blowing agent used is isobutane. One or more conventional or useful blowing agents can be used. Such other suitable volatile blowing agents include halocarbons such as fluorocarbons and chlorofluorocarbons; hydrohalocarbons such as hydrofluorocarbons and hydrochlorofluorocarbons, such as, dichlorotetrafluoroethane, dichlorodifluoroethane, dichloromonofluoromethane and trichloromonofluoromethane; alkylhalides, such as methyl chloride and ethyl chloride; hydrocarbons such as alkanes or alkenes; carbon dioxide, nitrogen, argon, water; and the like. Examples of useful alkanes having from 2 to 9 carbon atoms are ethane, propane, butane, pentane, is isopentane, hexane, isohexane, heptane, and the like.

The invention foam structure is formed by the extrusion accumulator process disclosed in U.S. Pat. No. 4,323,528, which is incorporated herein by reference. The process for producing large size, low or high density, elongated thermoplastic cellular bodies includes the forming of a mixture of a thermoplastic polymer-copolymer blend composition and the isobutane blowing agent dissolved therein under pressure and at a temperature at which the viscosity of the mixture is sufficient to retain the isobutane blowing agent when the mixture is allowed to expand. The mixture is extruded into a holding zone under conditions that prevent the mixture from foaming. The holding zone has an outlet die orifice opening into a zone of lower pressure and temperature at which the mixture foams. The outlet die orifice must be designed to allow the expansion of the fine celled foam to the appropriate stated width dimensions. An openable gate closes the die orifice. Periodically the gate is opened and substantially concurrently mechanical pressure is applied by a movable ram on the mixture, preferably while scraping the sides of the holding zone with the ram, to eject the mixture from the holding zone through the die orifice at a rate in excess of that at which substantial foaming in the die orifice occurs and less than that at which substantial irregularities in the cross-sectional area or shape of the cellular body occurs, preferably 9,000 lb/hour to 11,000 lb/hour, most preferably the foam ejection rate of 10,500 lb/hour. The ejected mixture is permitted to expand unrestrained in at least one dimension to produce the elongated thermoplastic cellular body. The apparatus for producing elongated thermoplastic cellular bodies includes an extruder for feeding a mixture of the thermoplastic polymer blend and the plasticizing isobutane blowing agent at a temperature suitable for producing a cellular body when the mixture is subjected to lower pressure, and an expandable holding chamber receiving the mixture from the extruder and maintaining the mixture in a molten state at a pressure above the foaming pressure thereof. There is ram means for ejecting the mixture out of the holding chamber, a die having an orifice, preferably in line with the ram means, through which the mixture is ejected from the holding chamber by operation of the ram means, and gate means contacting the exterior surface of the die for closing and sealing the die orifice while the holding chamber is being filled.

The conditions in the extruder portion of the extrusion-accumulator apparatus for the invention foam typically are:
Temperatures: Feed/Metering: 300° to 425°, preferably 320° to 400° F. Cooling: 120° to 230° F., preferably 150° to 180° F.
Pressures: 600 to 2000 psi, preferably 650 to 1,000 psi.

The conditions in the accumulator for the invention foam typically are:
Temperatures: 190° to 225° F., preferably 210° to 221° F.
Pressures: 200 to 1,000 psi, preferably 400 to 600 psi.

Extruded foam planks with cell size typically of the herein stated invention formed by extrusion using an extruder with an extrusion die, in the case of uncrosslinked PE or PE/EVA, have surface ripples, corrugations, warping and the like. To the contrary, the non-crosslinked PE/EVA or PE/EMA foam planks of the invention, which are formed by the extrusion accumulator system, do not have surface ripples, corrugations or warping. The foam planks of the invention have smooth flat surfaces. The invention process produces microcellular or fine celled foam structures and planks with cell counts usually within the range of 50 to 120 cpi, ideally greater than 70 cpi. The invention foam planks are substantially composed of closed cells.

The process and polymer blend compositions of the invention are particularly useful in producing polyolefin foam planks, especially polyethylene foam planks. For example, low density polyethylene foam with a density in the range of 1.2 to 2.6 pcf can be produced. The foam has a fine-celled closed structure containing greater than 50 cells per inch. The foam is made in plank form with finished nominal dimensions of 2¼ inches by 24 inches by 108 inches. Using the accumulator process, as described in U.S. Pat. No. 4,323,528, such flat foamed plank structure has been produced. Another example is that low density polyethylene foam planks having the same specifications as the preceding foam planks except that the finished nominal dimensions are 3¼ inches by 24 inches by 108 inches. Foam planks can be made in varying widths and length. High density polyethylene foam planks having a density of about 4 pcf or greater can be produced by the invention process and from the invention polymer blend compositions.

To accelerate the release of the isobutane blowing agent from the ejected thermoplastic foam, the ejected thermoplastic foam can be subjected to heat below any level having adverse effect on the thermoplastic foam or can be perforated so as to create a series of narrow channels in and/or through the thermoplastic foam.

The invention thermoplastic foams are recyclable in that the basic chemical nature of thermoplastic usually does not change significantly as a result of the extrusion process. Thermoplastic materials can generally be reground and recycled into a usable form. Thermosets undergo a crosslinking reaction when the temperature is raised above a certain point. The crosslinking forms a three dimensional network which remains intact when the temperature is reduced. This causes an irreversible change in the material and, therefore, can not be recycled like thermoplastic materials.

By way of summary, the product is a polyolefin foam with a density in the range of about 1.2 and about 9.0 pcf. The polyolefin foam planks can be low density, e.g., density of about 1.2 to about 2.6 pcf, or high density, e.g., density of about 4.0 to 9.0 pcf. The polyolefin is usually low density polyethylene. The foam is made in plank form, e.g., with nominal dimensions of 24 inches×108 inches×2 to 3½ inches. The foam has a fine-celled structure containing 50 to 120 cells per inch (cpi). Using the accumulator process as described in U.S. Pat. No. 4,323,528, the invention process is able to produce a flat foamed plank structure. The foam is a non-crosslinked thermoplastic material and is recyclable, unlike crosslinked foam. Like crosslinked foam, the invention foam is smooth to the touch and passes the surface abrasion resistance as required of the packaging of Class A surfaces. This invention foam is physically comparable with a crosslinked foam product with recyclability as an added bonus. The invention foam can be white or colored and can also contain additives, such as, UV stabilizers, antistats, pigments, antioxidants, etc. To improve softness, ethylene copolymers containing esters such as ethylene vinyl acetate (EVA) or ethylene methyl acrylate (EMA) can be added to the LDPE. The total ester monomer content of the final product (excluding the blowing agent) is in the range of 0.1 to 10 (or 20) percent. To improve stiffness of the ester modified foam, an ionomeric resin can be added in the range of up to 5 percent [e.g., 0.01 to 5 (or 10) percent]. The invention foam is preferably made with a crystalline silica nucleating agent or a sodium bicarbonate nucleating agent or a talc nucleating agent, and isobutane as the sole blowing agent. Glycerol monostearate (most preferred) or a similar fatty acid compound can be used as the permeability control agent.

A comparison of prior art crosslinked foam materials with invention non-crosslinked foam materials follows:

MATERIALS

| Sentinel MC1900e | Sentinel MC1900 | Inven. | Inven. | Inven. PE/EVA/ |
|---|---|---|---|---|

| PROPERTIES | xlpe/eva literature | xlpe literature | PE/EMA 2 wk test | PE/EVA 2 wk test | Ionomer 4 wk test |
|---|---|---|---|---|---|
| Density | 2 | 2 | 2 | 2 | 2 |
| CPI | 169 | 169 | 70–80 | 70–80 | 70–80 |
| Comp. Strength 25% | 4.5 | 8.5 | 7.6 | 6 | 8.2 |
| Comp. Sets | 20 | 15 | 12.5 | 19 | 15.6 |
| Tensile Strength (psi) | 50 | 40 | | 44 | |
| Tear Resistance (pli) | 8 | 7 | | 10 | |
| Water Absorption (ps) | 0.05 max | 0.05 max | | <0.05 | |
| Therm. Stab. % shrink | | | | | |
| CMD | | | <3% | <2% | <2.5% |
| MD | <2% | <2% | <3% | <2% | <3.5% |
| Thick | | | <3% | <3% | <5% |
| Die Cut, % | | | | | |
| CMD | <2% | | <2% | <2% | |
| MD | <2% | | <2% | <2% | <2% |
| Thickness | <4% | | <2% | <4% | <2.5% |

What is claimed is:

1. A process for preparing a non-crosslinked polyolefin foam elongated cellular body having a fine-celled closed structure, said fine-celled structure having a cell count greater than 50 cells/inch, said process comprising the steps of:
   melting a polyolefin and a copolymer of an olefin monomer and an ethylenic monomer different from the monomer of said polyolefin to form a polymeric blend, the amount of said copolymer being in the range of from 5 to 25 percent by weight of said blend;
   forming a mixture of said blend, an amount of fatty acid effective to provide stability, and an amount of a nucleating agent sufficient to produce a cell count greater than 50 cells/inch;
   dissolving an effective amount of a blowing agent in said mixture to form a blowing-agent-containing mixture; then
   extruding said blowing-agent-containing mixture into a holding zone;
   maintaining said holding zone at conditions, including temperature and pressure, at which said blowing-agent-containing mixture does not foam;
   transferring said blowing-agent-containing mixture into an expansion zone; and
   permitting said blowing-agent-containing mixture to expand in the expansion zone to produce said elongated cellular body.

2. The process of claim 1 wherein said polyolefin is selected from the group consisting of polyethylene and polypropylene.

3. The process of claim 2 wherein said polyethylene is selected from the group consisting of HDPE, MDPE, LDPE and LLDPE.

4. The process of claim 1 wherein said copolymer is selected from the group consisting of ethylene vinyl acetate and ethylene methyl acrylate.

5. The process of claim 1 wherein said fatty acid is selected from the group consisting of amides and esters of $C_{12-24}$ fatty acids.

6. The process of claim 5 wherein said fatty acid is selected from the group consisting of steryl stearamide, glycerol monostearate, glycerol monobehenate, and sorbitol monostearate.

7. The process of claim 6 wherein said fatty acid is glycerol monostearate.

8. The process of claim 1 wherein said nucleating agent is selected from the group consisting of crystalline silica, sodium bicarbonate and citric acid, talc, clay, mica, titanium oxide, zinc oxide, calcium silicate, barium stearate, zinc stearate and aluminum stearate.

9. The process of claim 8 wherein said nucleating agent is selected from the group consisting of crystalline silica, sodium bicarbonate and talc.

10. The process of claim 9 wherein said nucleating agent is crystalline silica, said crystalline silica being used in the amount of 10 to 25 percent by weight of the total weight of said mixture.

11. The process of claim 9 wherein said crystalline silica is being used in the amount of 13 to 17 percent by weight of the total weight of said mixture.

12. The process of claim 1 wherein said cell count is from 50 to 120 cells/inch.

13. The process of claim 1 wherein said cell count is greater than 70 cells/inch.

14. The process of claim 1 wherein said ethylenic monomer being in the amount of from 5 to 20 percent by weight of said copolymer.

15. The process of claim 1 wherein said elongated cellular body is a foam plank.

16. The process of claim 15 wherein said foam plank has a density of about 1.2 to about 2.6 pounds per cubic foot.

17. The process of claim 15 wherein said foam plank has a density of about 4.0 to about 9.0 pounds per cubic foot.

18. The process of claim 1 wherein said blowing agent is selected from the group consisting of halocarbons, hydrohalocarbons, alkylhalides, hydrocarbons, carbon dioxide, nitrogen, argon, and water.

19. The process of claim 18 wherein said blowing agent is a hydrocarbon, said hydrocarbon being selected from the group of alkanes and alkenes, said group of alkanes being selected from the group consisting of ethane, propane, butane, isobutane, pentane, isopentane, hexane, isohexane, and heptane.

20. The process of claim 19 wherein said blowing agent is isobutane.

21. The process of claim 1 wherein said mixture further includes an ionomer to improve the strength of said elongated cellular body.

22. The process of claim 1 wherein said polyolefin is low density polyethylene, said copolymer is selected from the group consisting of ethylene vinyl acetate and ethylene-methyl acrylate, said fatty acid is glycerol monostearate and said nucleating agent is selected from the group consisting of crystalline silica, sodium bicarbonate and citric acid, and talc.

* * * * *